Oct. 18, 1960

U. RAYDT ET AL 2,956,311

METHOD OF FORMING A SUSPENSION-TYPE
ELECTRIC TRANSMISSION CABLE

Filed April 10, 1957

United States Patent Office 2,956,311
Patented Oct. 18, 1960

2,956,311

METHOD OF FORMING A SUSPENSION-TYPE ELECTRIC TRANSMISSION CABLE

Ulrich Raydt and Karl Heinz Hahne, Osnabruck, Germany, assignors to Osnabrücker Kupfer- und Drahtwerk, Osnabruck, Germany, a corporation of Germany Filed Apr. 10, 1957, Ser. No. 651,916

Claims priority, application Germany June 26, 1956

4 Claims. (Cl. 18—59)

This invention relates to forming suspension-type cables for overhead electric transmission lines, in which the cables are commonly suspended on clips or carries from span wires or like tensile supports, the cables including single or multi-core conductors and being usually sheathed with metal or with non-metallic material.

The invention has for its main object to provide an improved method of forming a suspension-type electric transmission cable, which is enclosed together with its span wire or like support in a common coating or envelope, thereby dispensing with the conventional clips or carriers, the cable and support being separated from one another by a partition integral with the coating.

Another object of the invention is to provide a method of forming such a suspension-type transmission cable, in which the conductive core or cores and the span-wire or like support are arranged in two respective compartments of a coating, the latter being shaped so as to surround each of the enclosed members concentrically with walls of substantially even thickness and to afford a separating partition which also forms a suspension means between them.

A further object is to provide a method of manufacturing such suspension-type transmission cables, whereby the conductive core or cores and the span wire or like support are enclosed in a coating as it is produced, for example by an extrusion press, and the coating is thereupon closed around the two members so as to surround them with walls of substantially even thickness in direct contact therewith and to constitute the separating and suspension means.

Other objects and advantages of the invention will appear from the following description, given with reference to the accompanying diagrammatic drawings, in which:

Fig. 5a is an end view of the extrusion head seen in Fig. 4a;

Figure 1:
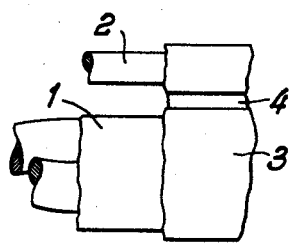
Fig. 1 is a part elevation of a three-core electric cable of suspension-type, a span wire for supporting the cable and a surrounding coating or envelope.
Figure 2:
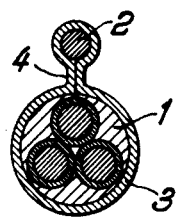
Fig. 2 is a cross-section thereof.

Referring to Figs. 1 and 2, the cable is illustrated as having three conductor cores, insulated from one another and enclosed in a cylindrical sheath 1 of vulcanized rubber, thermoplastic material or the like. Above the cable there is shown a span wire 2, which supports the weight of the cable in its span between the towers or poles of an overhead transmission system (not shown). Both the cable and the span wire 2 are enclosed in a common coating or envelope 3, made for example of thermoplastic or vulcanizable material like a rubber hose pipe, which forms walls of substantially even thickness around the two compartments containing the parts 1 and 2 respectively; between these two compartments, the opposite walls unite at 4 to constitute a separator and suspension means, the two contacting faces of the walls being welded together, for example by pressure when still in a plastic state.

Figure 3:
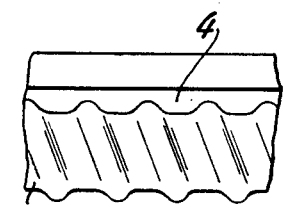
Fig. 3 is a part elevation of a suspension-type electric cable, its span wire and coating, the cable being of corrugated sheath type.

Fig. 3 represents in side elevation a similar arrangement of the cable and span wire, except that in this case the outer sheath 1' of the cable is made of metal and corrugated as described in the Electrical World, October 29, 1956.

Figure 4A:
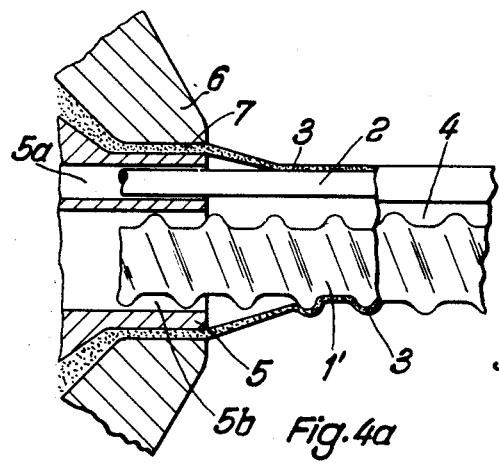
Fig. 4a is a part sectional side elevation of the extrusion head of a press for production of the coating, the latter being partly broken away; the cable is shown provided with a corrugated metal sheath, and the coating is seen partly in section and partly in elevation.
Figure 5A:
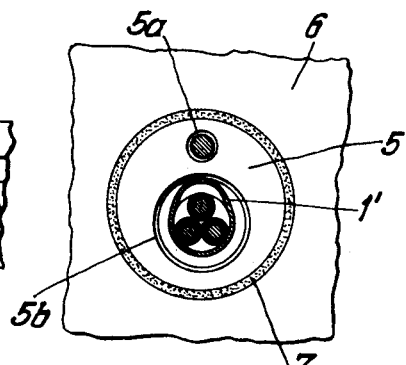
Figure 4B:
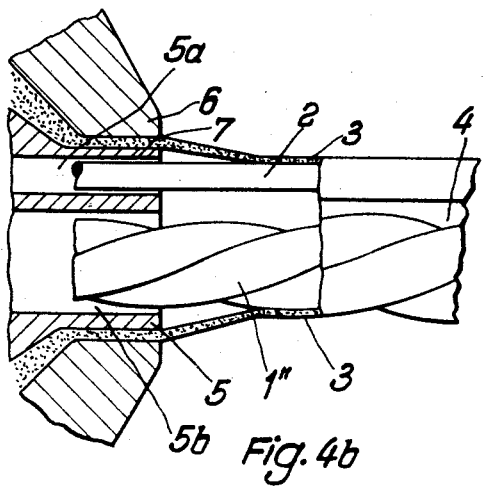
Fig. 4b is a part-sectional side elevation of the extrusion head of a press for production of the coating, the latter being partly broken away; the cable shown consists of three insulated cores, without fillers, and the coating is seen partly in section and partly in elevation.
Figure 5B:
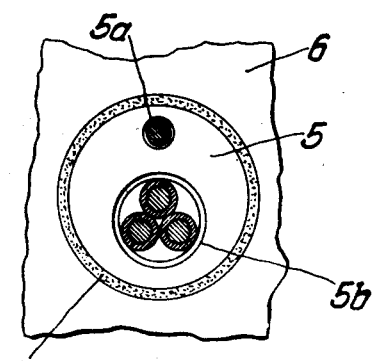
Fig. 5b is an end view of the extrusion head seen in Fig. 4b.

It will be noted that in both these arrangements, the cable and its span wire are contained concentrically in the respective portions or compartments of the coating or envelope 3, while the rest of the coating forms a separator and also the suspension means to replace the conventional clips or carriers; it will also be noted that the invention can be applied not only to cables having a cylindrical outer sheath, as seen in Figs. 1 and 2, but also to cables having a corrugated sheath, as seen in Fig. 3, or to a multicore cable, consisting for example of three insulated stranded cores, without fillers, as seen in Fig. 4b. The enclosure of a cable together with its span wire in a common coating or envelope formed by extruding a plastic material in immediate and direct contact therewith would require very accurate centering and guiding of the parts if considerable fluctuations of the wall thickness of the coating were to be avoided, and such method of production would obviously be impossible in the case of a cable having a sheath which is corrugated or in other respects irregular or non-cylindrical in longitudinal section. These difficulties are overcome in the present case by a particular method of manufacture as follows:

The coating 3 is produced in tubular form, large enough to encompass the cable and span wire, at the relative spacing which they have to occupy in the finished cable, by an extrusion press, of which the head is fitted with a hollow mandrel 5 of cyindrical shape, as shown in Figs. 4a and 4b, centered inside the mouth-piece 6 of the press, the annular gap between them being of a width proportional to the desired wall thickness of the coating, which is shown as a tube 7 in its original form. The mandrel 5 is bored to provide two holes 5a and 5b, of diameters corresponding to the outside diameters of the span wire and cable respectively, and through these holes the wire and cable are fed by conventional means at a speed corresponding to the speed of extrusion of the tube 7, which thus surrounds the wire and cable without touching them. After leaving the mandrel 5, and while still in plastic state by reason of its relatively high operating temperature, the tube 7 is subjected to internal vacuum, applied for example through the holes 5a and 5b through which the span wire and the cable run, causing the walls of the tube 7 to collapse into direct contact with the wire and cable and to adhere thereto, thus forming the coating or envelope 3. The spacing of the holes 5a and 5b is equal to the spacing of the wire and cable in the finished article, such as shown in Figs. 1 and 2, so that in addition to coating the wire and cable the material of the plastic tube 7 will form a double thickness of wall in the interval between them, these two wall-thicknesses being welded together at 4 as a solid mass, under the atmospheric pressure from the outside acting against the vacuum inside; the action may be assisted by the application of mechanical pressure by rollers mounted on vertical axes on opposite sides of the wall thicknesses to be welded, thereby ensuring the solidity of the material at this point.

In applying the invention to cables having no metallic sheath but having the conductor core or cores 1″ insulated by vulcanizable or thermoplastic material, as shown in Fig. 4b, the customary fillers and braiding may be omitted, the coating 3 of thermoplastic or vulcanizable material uniting firmly with the insulation of the core or cores. The invention may also be applied to cables having no such insulating material, the plastic coating 3 taking the place of the insulation and penetrating into the helical spaces between the twists of the stranded conductors. Thus the material for the filler layer and even for the insulation may be saved, as well as the labour necessary for its application, the resulting cable being therefore lighter, which is particularly desirable for suspension-type transmission lines. The provision of the plastic coating or envelope 3 dispenses with the usual clips or carriers for suspending the cable, and by protecting the span wire 2 against atmospheric attack may enable a thinner wire to be used, thereby again reducing the weight of the cable.

What we claim is:

1. A method of producing a suspension-type electric transmission cable having a common coating upon a core and a support which are radially spaced apart by a web defined by the material of said coating, comprising the steps of forming a tubular coating of thermoplastic material around a cylindrical hollow mandrel centered in the orifice of an extrusion press and having two bores spaced apart a distance corresponding to the width of said web, introducing into one of said bores of said mandrel at least one conductive core and simultaneously introducing into the other of said bores a tensile support parallel thereto, feeding said core and said support from said mandrel along with said coating, creating a vacuum inside said coating while it is still in a plastic state, whereby its wall is caused to collapse into direct contact with said core and said support, and uniting the portions of said wall lying between said core and said support into a solid mass to form said web.

2. A method of producing a suspension-type electric transmission cable having a common coating upon a core and a support which are radially spaced apart by a web defined by the material of said coating, comprising the steps of forming a tubular coating from thermoplastic material around a cylindrical hollow mandrel centered in the orifice of an extrusion press and having two bores spaced apart a distance corresponding to the width of said web, introducing into one of said bores a plurality of conductive cores enclosed in an outer sheath, simultaneously introducing into the other of said bores a tensile support extending parallel to said sheath, feeding the sheathed cores and said support from said mandrel along with said coating, creating a vacuum inside said coating while it is still in a plastic state, whereby its wall is caused to collapse into direct contact with said sheath and said support, and uniting the portions of said wall lying between said sheathed cores and said support into a solid mass to form said web.

3. A method of producing a suspension-type electric transmission cable having a common coating upon a core and a support which are radially spaced apart by a web defined by the material of said coating, comprising the steps of forming a tubular envelope of thermoplastic material around a cylindrical hollow mandrel centered in the orifice of an extrusion press and having two bores spaced apart a distance corresponding to the width of said web, introducing into one of said bores a plurality of stranded conductive cores each enclosed in an outer sheath and simultaneously introducing into the other of said bores of said mandrel a tensile support extending parallel to the length of said cores, feeding said cores and said support from said mandrel along with said envelope, creating a vacuum inside said envelope while it is still in a plastic state, whereby its wall is caused to collapse into direct contact with said sheathed cores and said support, and uniting the portions of said envelope wall lying between said cores and said support into a solid mass to form said web.

4. A method of producing a suspension-type electric transmission cable having a common coating upon a core and a support which are radially spaced apart by a web defined by the material of said coating, comprising the steps of forming a tubular coating of thermoplastic material around a hollow mandrel centered in the orifice of an extrusion press having two bores spaced apart a distance corresponding to the width of said web, introducing into one of said bores a conductive cable having a corrugated metal sheath, simultaneously introducing into the other of said bores a tensile support extending parallel to said metal-sheathed cable, feeding said metal-sheathed cable and said support from said mandrel along with said tubular coating, creating a vacuum inside said tubular coating while it is still in a plastic state, whereby its wall is caused to collapse into direct contact with said metal-sheathed cable and said support, and uniting portions of said wall lying between said metal-sheathed cable and said support into a solid mass to form said web.

References Cited in the file of this patent

UNITED STATES PATENTS

| Number | Name | Date |
|---|---|---|
| 960,291 | Egner et al. | June 7, 1910 |
| 1,721,218 | Hood | July 16, 1929 |
| 1,823,885 | Cherry | Sept. 22, 1931 |
| 2,122,335 | Berman et al. | June 28, 1938 |
| 2,382,423 | Kauth | Aug. 14, 1945 |
| 2,471,752 | Ingmanson | May 31, 1949 |
| 2,504,845 | Keyes | Apr. 18, 1950 |
| 2,624,073 | Pugh | Jan. 6, 1953 |